United States Patent [19]
Dix

[11] Patent Number: 6,001,138
[45] Date of Patent: Dec. 14, 1999

[54] METHODS OF FORMING BATTERY ELECTRODES

[75] Inventor: Eric R. Dix, Boise, Id.

[73] Assignee: Micron Communications, Inc., Boise, Id.

[21] Appl. No.: 08/917,442

[22] Filed: Aug. 22, 1997

[51] Int. Cl.[6] .................................................. H01M 4/04
[52] U.S. Cl. .................... 29/623.1; 429/128; 429/231.95
[58] Field of Search .............. 429/231.95, 128, 429/218.1, 162, 209; 29/623.1; 264/119, 320; 72/358, 352

[56] References Cited

U.S. PATENT DOCUMENTS

| | | | |
|---|---|---|---|
| 4,825,680 | 5/1989 | Coe et al. | 72/352 |
| 5,480,462 | 1/1996 | Tuttle | 29/623.5 |
| 5,520,903 | 5/1996 | Chang et al. | 423/194 |
| 5,618,640 | 4/1997 | Idota et al. | 429/218.1 |
| 5,770,329 | 6/1998 | Harney et al. | 429/112 |
| 5,804,333 | 9/1998 | Shioda et al. | 429/128 |

FOREIGN PATENT DOCUMENTS

| | | | |
|---|---|---|---|
| 58-1968 | 1/1983 | Japan . | |
| 58-51470 | 3/1983 | Japan | 429/162 |
| 59-98456 | 6/1984 | Japan . | |
| 60-131763 | 7/1985 | Japan . | |
| 61-4160 | 1/1986 | Japan | 29/623.1 |
| 61-240574 | 10/1986 | Japan . | |
| 63-29444 | 2/1988 | Japan . | |
| 4-351848 | 12/1992 | Japan . | |
| 7-272717 | 10/1995 | Japan . | |
| 8-241709 | 9/1996 | Japan . | |

*Primary Examiner*—Maria Nuzzolillo
*Assistant Examiner*—Susy Tsang
*Attorney, Agent, or Firm*—Wells, St. John, Roberts, Gregory & Matkin P.S.

[57] ABSTRACT

Methods of forming battery electrodes are described. In one embodiment, a discrete amount of electrode material having a volume and a first shape is provided. The electrode material is deformably molded into a second shape which is different from the first shape and which defines a desired battery electrode shape. The battery electrode shape has a volume which is substantially the same as the volume of the provided amount of electrode material. In a preferred implementation, a molding cavity is provided and defines at least in part the desired battery electrode shape. The electrode material is placed into the molding cavity and pressed into the electrode shape.

8 Claims, 3 Drawing Sheets

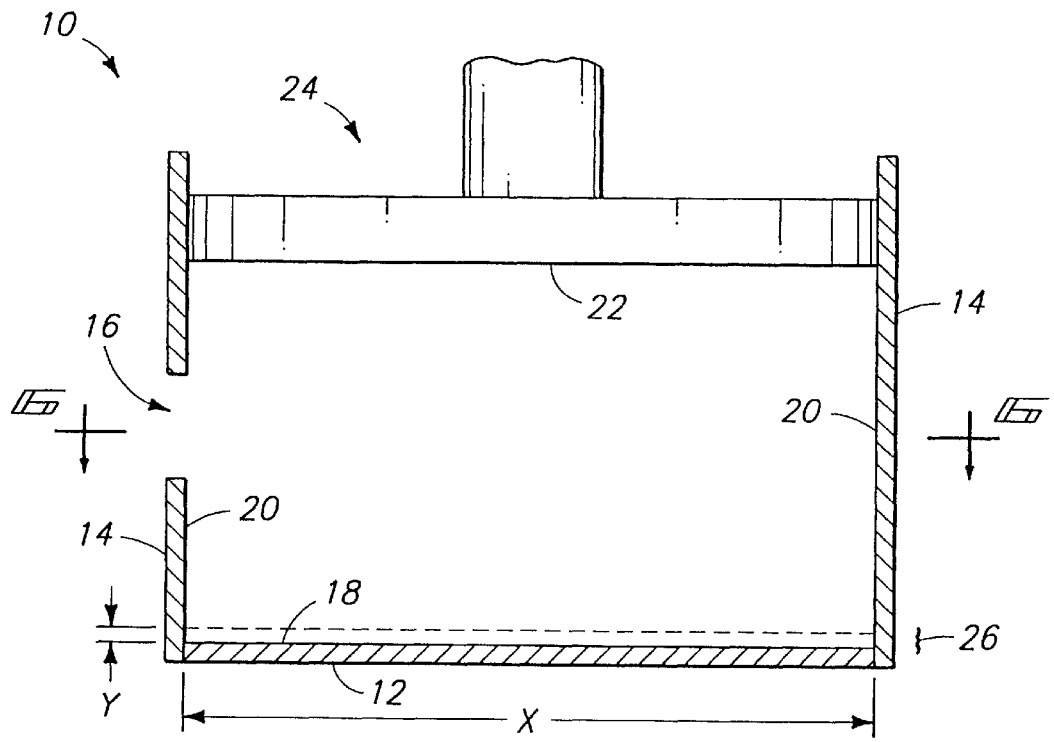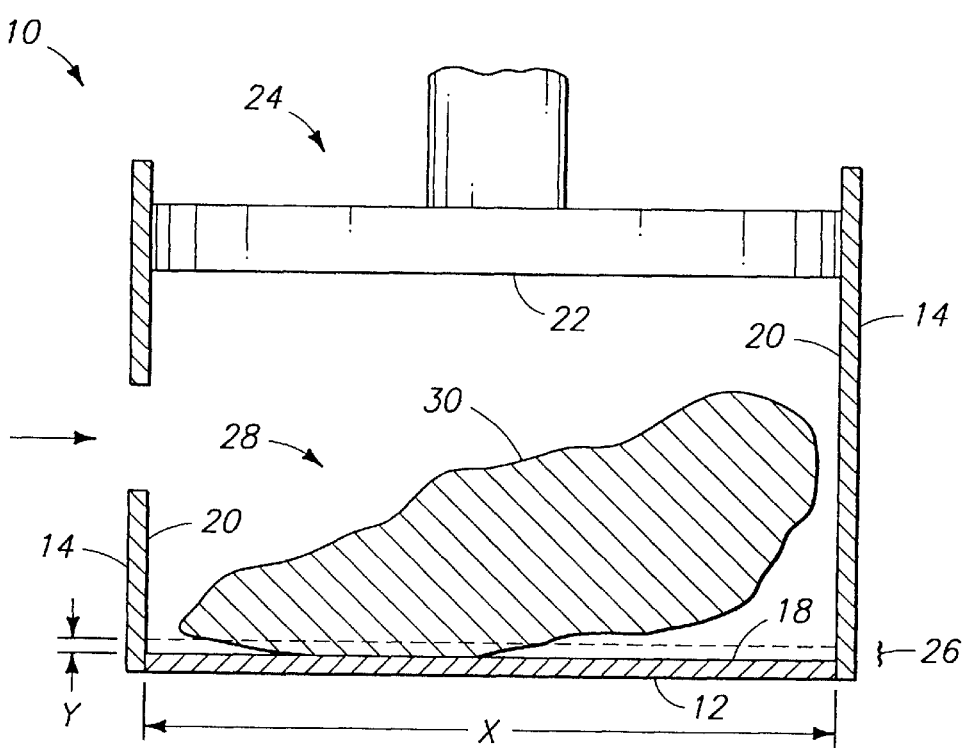

6,001,138

METHODS OF FORMING BATTERY ELECTRODES

TECHNICAL FIELD

This invention relates to methods of forming battery electrodes, and in particular thin lithium electrodes.

BACKGROUND OF THE INVENTION

Thin-profile or button-type batteries are small, thin energy cells that are commonly used in watches and other electronic devices requiring a thin profile. A conventional thin-profile battery includes two electrodes in the form of an anode and a cathode. The electrodes are separated by a porous separator. An electrolyte is present within pores of the separator.

The internal battery components are housed within a metal casing or housing formed by first and second battery terminal housing members. Typically the housing members comprise a can and a lid and are formed from stainless steel. The can is typically in electrical contact with the cathode to form the positive battery terminal, and the lid is in electrical contact with the anode to form the negative battery terminal. The can and lid are crimped or pressed together to form a fluid-tight seal which entirely encloses the anode, cathode, separator, and electrolyte. An electrically insulating sealing gasket is provided within the primary seal between the lid and the can to electrically isolate the two housing members.

One electrode material is elemental lithium, which is typically utilized within the lid as the anode electrode. The typical anode assembly method comprises placing a piece of lithium, already in its finished anode shape, to within the center of a pre-formed lid. The lithium adheres to the lid material and the lid/lithium composite can then be easily mounted to the cathode can without dislodging the lithium. Lithium is typically available in very thin foil sheets. The cost of these sheets is an expensive design consideration and adds significantly to the cost of an end product incorporating a lithium electrode. This is especially true as the thickness of the lithium electrode falls to 5 mils and below. Exemplary processing methods are described in U.S. Pat. No. 5,480,462 entitled "Method of Forming Button-type Battery Lithium Electrodes".

This invention grew out of concerns associated with improving the manner in which battery electrodes, and in particular thin lithium electrodes are formed. In addition, this invention grew out of concerns associated with reducing the cost associated with forming thin-profile batteries which incorporate lithium electrodes.

SUMMARY OF THE INVENTION

Methods of forming battery electrodes are described. In one embodiment, a discrete amount of electrode material having a volume and a first shape is provided. The electrode material is deformably molded into a second shape which is different from the first shape and which defines a desired battery electrode shape. The battery electrode shape has a volume which is substantially the same as the volume of the provided amount of electrode material. In a preferred implementation, a molding cavity is provided and defines at least in part the desired battery electrode shape. The electrode material is placed into the molding cavity and pressed into the electrode shape.

BRIEF DESCRIPTION OF THE DRAWINGS

Preferred embodiments of the invention are described below with reference to the following accompanying drawings.

FIG. 1 is a view of a processing chamber which defines a molding cavity in accordance with a preferred implementation of the invention.

FIG. 2 is a view of the FIG. 1 processing chamber undergoing processing in accordance with a preferred methodology.

DETAILED DESCRIPTION OF THE PREFERRED EMBODIMENTS

Figure 3:
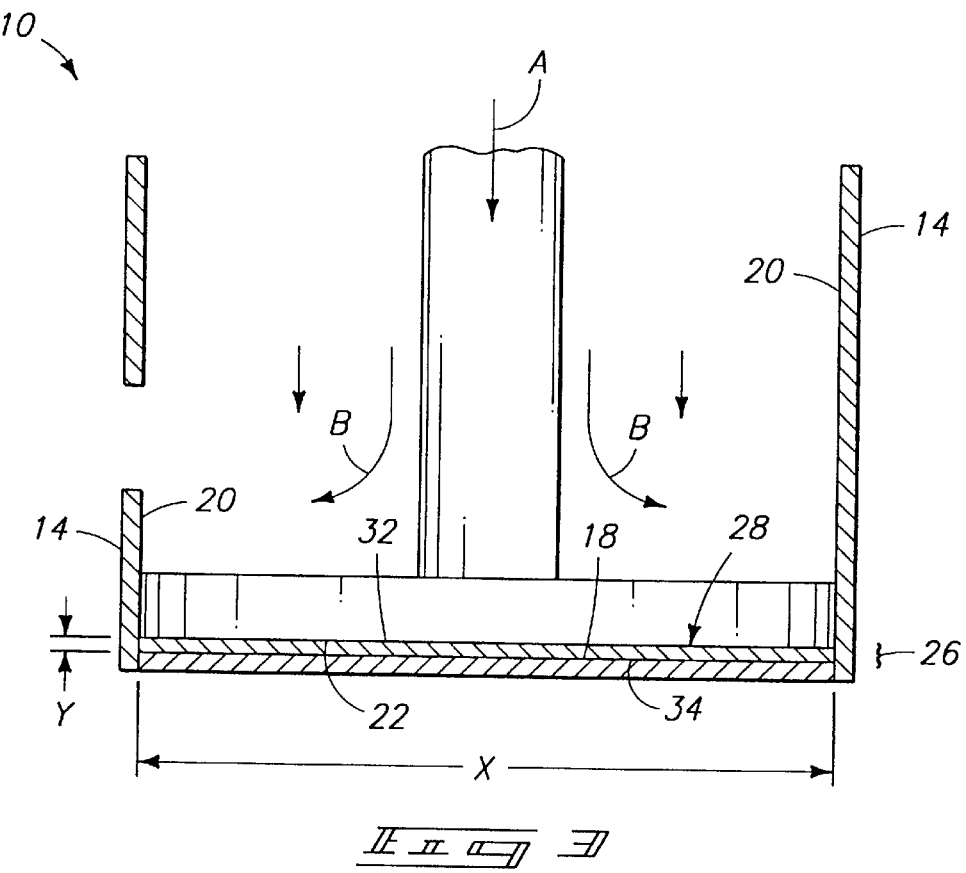
FIG. 3 is a view of the FIG. 1 processing chamber at a different processing step.

This disclosure of the invention is submitted in furtherance of the constitutional purposes of the U.S. Patent Laws "to promote the progress of science and useful arts" (Article 1, Section 8).

Referring to FIG. 1, a processing chamber is indicated generally at 10 and is configured for forming battery electrodes in accordance with a preferred implementation of the invention. Chamber 10 includes a base 12 and a sidewall 14 connected with the base and extending away therefrom. An opening 16 is provided in sidewall 14 and accommodates insertion or placement of electrode material as will become apparent below. Base 12 defines a generally planar surface 18 inside processing chamber 10, and sidewall 14 defines an inner surface 20 in the processing chamber. A press surface 22 is provided and comprises part of a press 24 which is mounted for reciprocation is within processing chamber 10.

Surfaces 18, 20 define a mold or molding cavity into which conductive electrode material is to be provided and molded into a desired battery electrode shape. The molding cavity has a volume only a portion of which defines the desired battery electrode shape. An exemplary shape-defining portion is indicated by dashed lines at 26.

Figure 6:
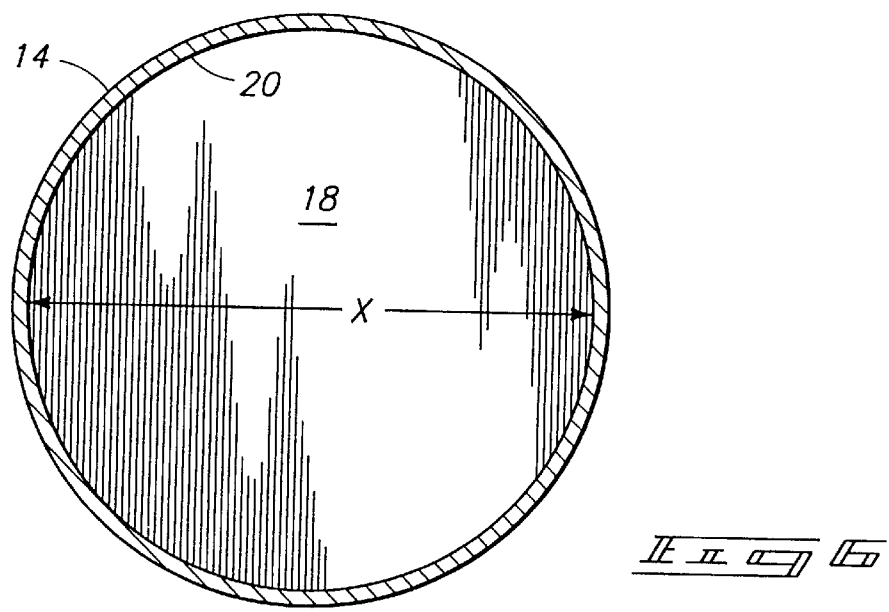
FIG. 6 is a view which is taken along line 6—6 in FIG. 1.

Referring to FIGS. 1 and 6, shape-defining portion 26 is shown in more detail. Inner surface 20, which is generally non-planar and curved, defines a generally cylindrical shape. In the illustrated example, that portion of inner surface 20 which defines shape-defining portion 26 extends away from surface 18 a distance y. Distance y is less than a maximum linear dimension x which is defined by surface 18 and defines an ultimate battery electrode thickness which is preferably no greater than about 4 mils. About 3 mils or less is more preferred for thinner batteries.

Referring to FIG. 2, a discrete amount or mass of electrode material 28 is provided or metered into the molding cavity. Electrode material 28 has an outer surface 30 which defines a volume and a first shape. In the illustrated example, the first shape is generally irregular (i.e. is not predefined) and comprises a bulk amount of electrode material. By "irregular" is meant that such first shape is generally without symmetry or is uneven. Such irregularly-shaped bulk amount can come in a variety of forms such as a mass of wire or a glob of electrode material. Some of the illustrated electrode material 28 is disposed within a portion of the molding cavity volume which does not define the desired battery electrode shape, e.g., that which is disposed above shape-defining portion 26. An exemplary material for electrode material 28 is lithium.

Figure 5:
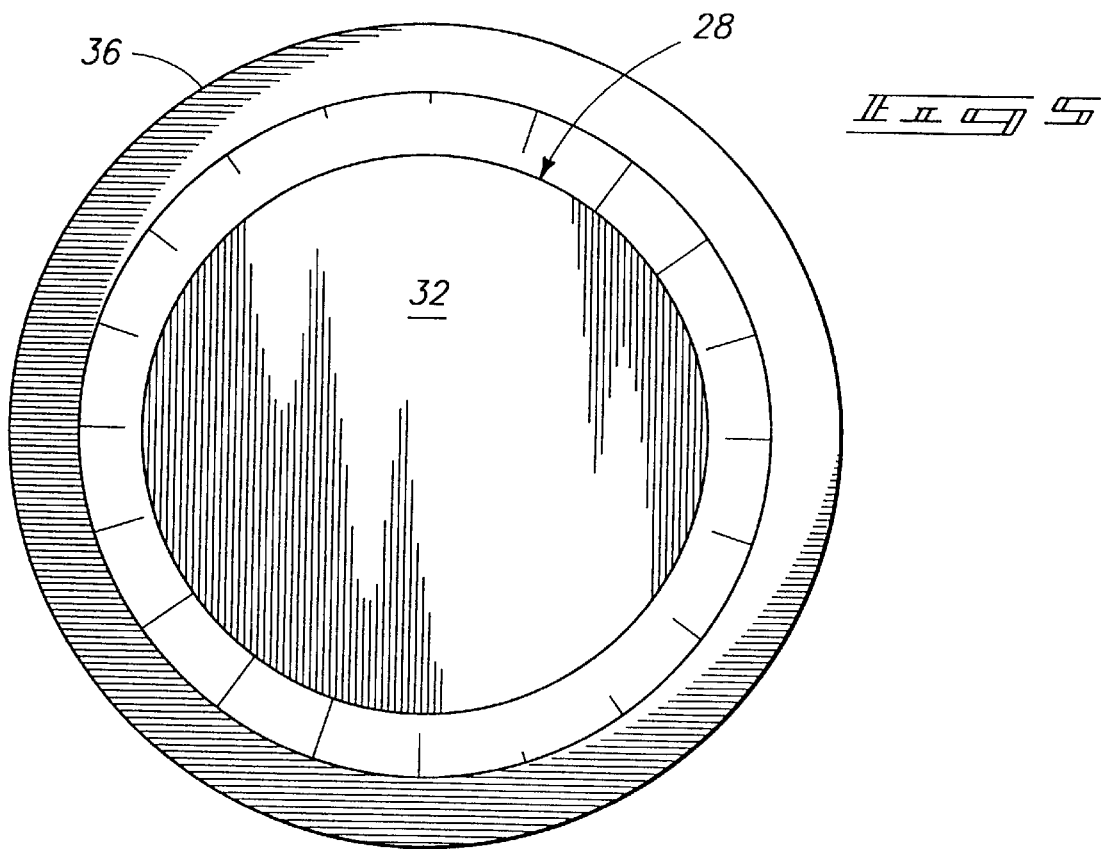
FIG. 5 is a top plan view of the FIG. 4 battery terminal housing member.

Referring to FIG. 3, electrode material 28 is pressed into shape-defining portion 26 and accordingly, the desired battery electrode shape. In the illustrated example, electrode material 28 is squeezed between a pair of generally planar surfaces 18, 22. Surfaces 18, 22 define at least a portion of a second shape which is different from the first shape and imparted to electrode material 28. Accordingly, electrode material 28 is provided with generally planar outer surfaces 32, 34 which are generally circular in shape (FIG. 5). Additionally, the battery electrode shape has a thickness y which is less than a maximum linear dimension x of the electrode. To effectuate the desired battery electrode shape, press 24 moves press surface 22 within the cavity volume in a first direction A. Electrode material 28 is engaged by press surface 22 which causes at least some of the electrode material to be moved in a second direction B which is different from first direction A. Such moving substantially fills shape-defining portion 26. In the illustrated example, the second direction includes components which are generally outwardly of first direction A, and specifically components which are generally radially outwardly of first direction A.

The above constitutes but one example in which electrode material 28 is deformably molded into a second shape which is different from its original first shape.

Figure 4:
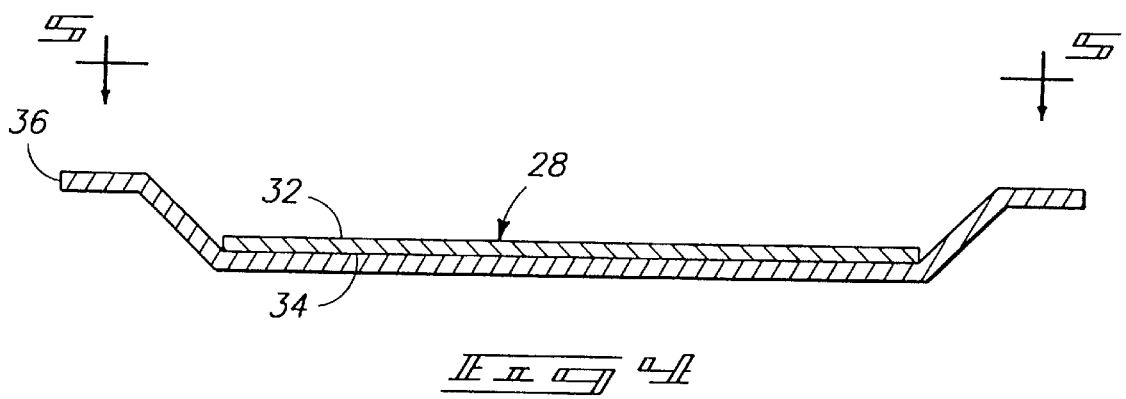
FIG. 4 is a view of a battery terminal housing member on which a battery electrode is mounted.

Referring to FIGS. 4 and 5, a battery terminal housing member 36 is provided. Electrode material 28 is mounted on and within housing member 36. Such can be accomplished in a number of ways. For example, after electrode material 28 is pressed into its desired electrode shape, it can be removed from the molding cavity and subsequently mounted on housing member 36. A vacuum pick device can be employed to attach electrode material 28 and transport it to housing member 36. Alternately, base 12 of processing chamber 10 can be moved and press 24 can further move electrode material 28 in the direction of direction A and into housing member 36 which would be placed immediately therebelow.

The above-described methodology permits a bulk electrode material to be utilized to form desired electrode shapes. A substantial cost savings can be realized because expensive thin sheet foil material is no longer necessary. A particular area of application is in the formation of thin-profile or button-type batteries.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of forming a battery electrode which is mountable on a battery terminal housing member comprising:

providing a molding cavity having a volume defined in part by a base and a press, only a portion of the volume defining a battery electrode shape, the molding cavity being different from the battery terminal housing member;

providing an amount of electrode material into the molding cavity, at least some of the electrode material being disposed within a portion of the molding cavity volume which does not define the battery electrode shape;

with the press, pressing the amount of electrode material into the cavity volume portion which defines the battery electrode shape against the base to form the battery electrode; and after the pressing, vacuum picking the battery electrode from the molding cavity.

2. The method of claim 1, wherein the base and press comprise respective planar molding surfaces.

3. The method of claim 1, wherein the battery electrode comprises a thickness no greater than about 4 mils.

4. The method of claim 1, wherein the battery electrode shape comprises a thickness which is less than a maximum linear dimension of the electrode.

5. The method of claim 1, wherein the battery electrode shape comprises a circular outer surface.

6. The method of claim 1, wherein the battery electrode shape comprises:

a thickness which is less than a maximum linear dimension of the electrode; and a circular outer surface.

7. The method of claim 1, wherein the electrode material comprises lithium, and the battery electrode is an anode.

8. The method of claim 1 further comprising inserting the battery electrode into a battery housing.

\* \* \* \* \*